(12) United States Patent
Babington

(10) Patent No.: US 7,798,138 B2
(45) Date of Patent: Sep. 21, 2010

(54) CONVECTION OVEN INDIRECTLY HEATED BY A FUEL BURNER

(75) Inventor: Robert S. Babington, McLean, VA (US)

(73) Assignee: Babington Enterprises, McLean, VA (US)

(*) Notice: Subject to any disclaimer, the term of this patent is extended or adjusted under 35 U.S.C. 154(b) by 0 days.

(21) Appl. No.: 12/167,330

(22) Filed: Jul. 3, 2008

(65) Prior Publication Data

US 2010/0000509 A1 Jan. 7, 2010

(51) Int. Cl.
F24C 15/00 (2006.01)
F24C 15/32 (2006.01)

(52) U.S. Cl. .................................... 126/19 R; 126/21 A
(58) Field of Classification Search ............... 126/19 R, 126/21 A, 21 R; 99/352; 432/76
See application file for complete search history.

(56) References Cited

U.S. PATENT DOCUMENTS

| 2,339,365 | A | * | 1/1944 | Guilder ........................ 432/76 |
| 3,408,999 | A | * | 11/1968 | Mutchler ...................... 126/44 |
| 3,812,838 | A | * | 5/1974 | Mutchler ................... 126/21 A |
| 3,978,782 | A | | 9/1976 | Werling |
| 4,155,700 | A | | 5/1979 | Babington |
| RE30,285 | E | | 5/1980 | Babington |
| 4,298,338 | A | | 11/1981 | Babington |
| 4,507,074 | A | | 3/1985 | Babington et al. |
| 4,507,076 | A | | 3/1985 | Babington |
| 4,516,928 | A | | 5/1985 | Babington |
| 4,573,904 | A | | 3/1986 | Babington |
| 5,228,385 | A | * | 7/1993 | Friedrich et al. .............. 99/352 |
| 5,704,278 | A | * | 1/1998 | Cross .......................... 99/427 |
| 5,975,071 | A | | 11/1999 | Babington |
| 6,176,233 | B1 | | 1/2001 | Babington |
| 6,453,487 | B1 | | 9/2002 | Babington |
| 7,066,168 | B1 | * | 6/2006 | Friedrich et al. .............. 126/20 |
| 7,100,599 | B2 | | 9/2006 | Babington |
| 2003/0000514 | A1 | * | 1/2003 | Cole et al. ................. 126/21 A |
| 2004/0216732 | A1 | * | 11/2004 | McFadden ................ 126/21 A |
| 2006/0016348 | A1 | | 1/2006 | Babington |

* cited by examiner

Primary Examiner—Kenneth B Rinehart
Assistant Examiner—Chuka C Ndubizu
(74) Attorney, Agent, or Firm—Connolly Bove Lodge & Hutz LLP

(57) ABSTRACT

A convection oven is disclosed. The convection oven includes an indirect heating chamber and a housing forming both an oven chamber and a circulation path between the oven chamber and the indirect heating chamber. An air circulator is adapted to circulate air through the circulation path. A fuel burner is adapted to generate heat, and heat from the fuel burner is transferred to the indirect heating chamber through a heat exchange interface.

18 Claims, 7 Drawing Sheets

CONVECTION OVEN INDIRECTLY HEATED BY A FUEL BURNER

BACKGROUND OF THE INVENTION

1. Field of the Invention

The field of the present invention is convection ovens.

2. Background

Convection ovens have enjoyed wide-spread popularity in commercial food establishments due to their ability to quickly and efficiently cook large quantities of food. Both electric and gas-fired convection ovens are known. Gas-fired convection ovens typically include an insulated oven chamber having an access door on the front side thereof. An inlet air passageway including a combustion chamber is typically located below the oven chamber and is separated from the oven chamber by the floor. One or more gas burners fire into the combustion chamber and heat the air within. A blower fan is disposed in the oven chamber, typically in the rear, and draws heated air from the combustion chamber into the oven chamber. The blower fan then mixes the heated air with air already in the oven chamber and circulates the mixed air within the oven chamber to cook food therein. An exhaust passageway, typically in the upper part of the oven, exhausts air that is displaced by the heated air from the combustion chamber.

The heat sources for conventional convection ovens tends to make them not portable—an oven having an electric element as the heat source would require a not-insubstantial power generator, especially when multiple ovens are used, and an oven using natural gas would require a pressurized gas source. Ovens heated by natural gas could be converted to liquid propane and use a portable LP tank, but resources for refilling LP tanks can sometimes be scarce. On the other hand, other types of liquid fuel that are less volatile and easier to transport and store, such as diesel fuel or kerosene, while not currently used as a source for heating convection ovens, could provide an easily replenishable fuel source.

SUMMARY OF THE INVENTION

The present invention is directed toward a convection oven. An oven housing forms an oven chamber and a circulation path between the oven chamber and an indirect heating chamber. An air circulator circulates air through the circulation path, and a fuel burner, which is adapted to generate heat, provides heat to the indirect heating chamber through a heat exchange interface.

The convection oven may be constructed with additional options to improve functionality, any of which may be employed alone or in combination. As one option, the housing may include a plurality of air intake ports in a first wall of the oven chamber and a plurality of heat discharge ports in a second wall of the oven chamber, with the air intake ports and the heat discharge ports forming part of the circulation path. The first wall of the oven chamber may be the top wall, and the second wall of the oven chamber may be one of the side walls.

As another option, the convection oven may further include a direct heating chamber which adjoins the indirect heating chamber at the heat exchange interface. The direct heating chamber may include at least one channel adapted to direct heat across a substantial portion of the heat exchange interface. Further, the direct heating chamber may include insulation disposed opposite the heat exchange interface, such that the at least one channel is disposed between the heat exchange interface and the insulation.

As yet another option, the indirect heating chamber includes at least one channel forming part of the circulation path and being adapted to direct air across a substantial portion of the heat exchange interface. The channel may be disposed between the heat exchange interface and the bottom wall of the oven chamber. Further, the air circulator may be adapted to direct air emerging from the channel into the oven chamber.

As yet another option, the fuel burner may comprise a liquid fuel burner adapted to generate heat through a combustion process.

Accordingly, an improved convection oven is disclosed. Advantages of the improvements will appear from the drawings and the description of the preferred embodiment.

BRIEF DESCRIPTION OF THE DRAWINGS

In the drawings, wherein like reference numerals refer to similar components.

DETAILED DESCRIPTION OF THE PREFERRED EMBODIMENT

Figure 1:
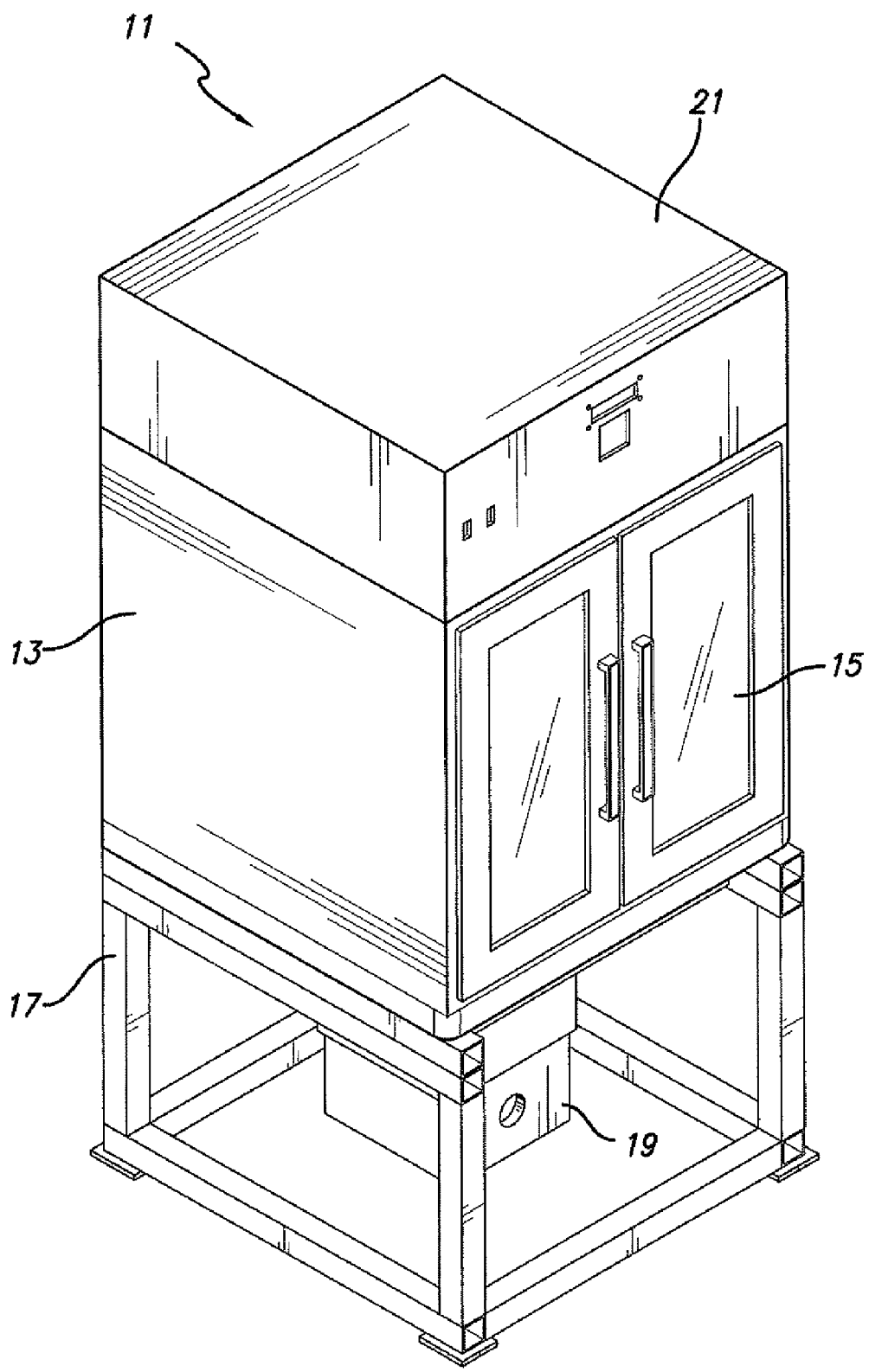
FIG. 1 illustrates a front perspective view of a convection oven.
Figure 2:
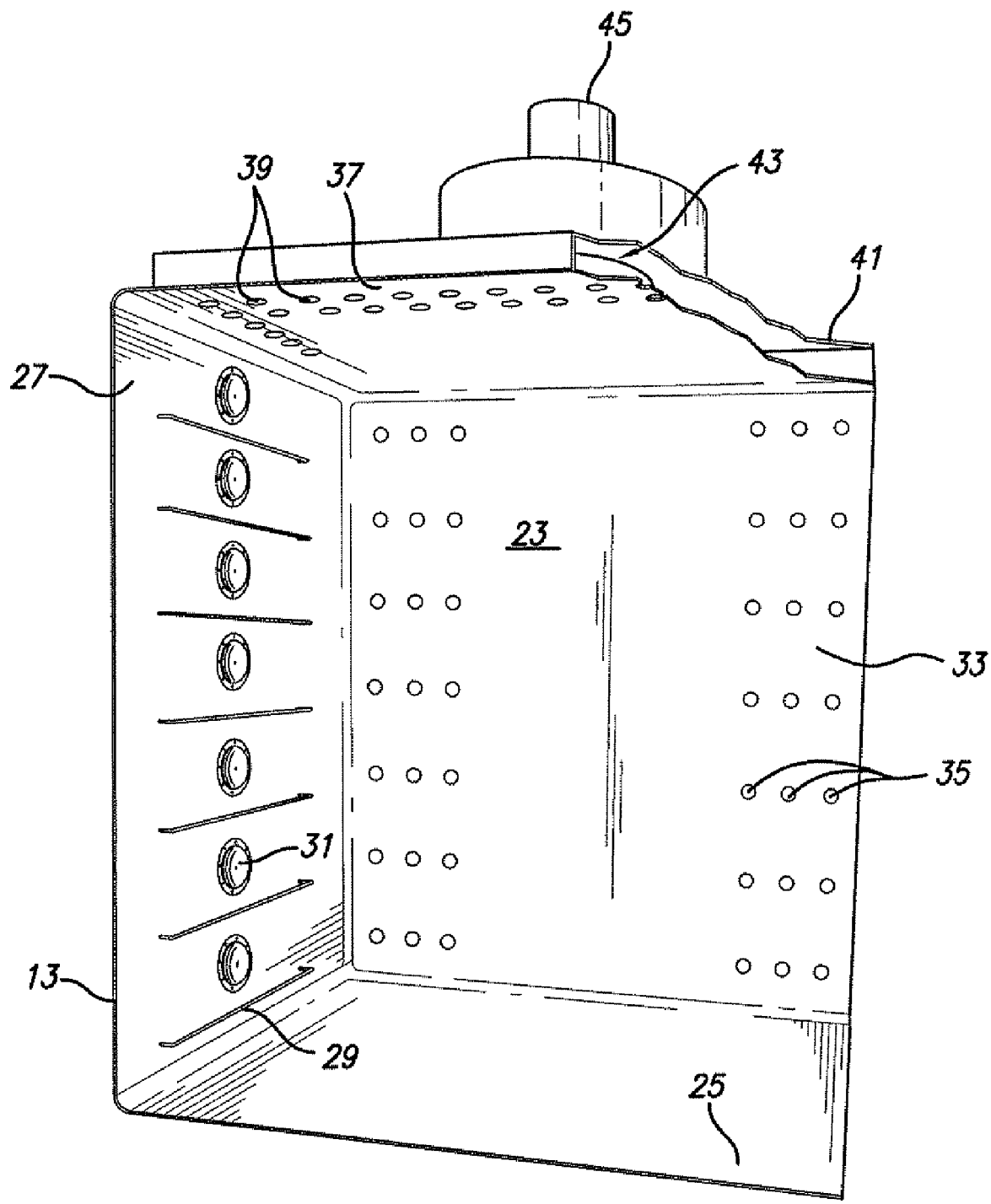
FIG. 2 is a partial perspective view of the interior of the convection oven.

Turning in detail to the drawings, FIG. 1 shows a convection oven 11 in which an oven housing 13, fronted by a pair of hinged oven doors 15, forms an oven chamber (see FIG. 2). The oven housing 13 sits on a frame 17 which permits the fire box 19 to be affixed to the underside of the housing 13. The structure and design of the frame or other oven support is a matter of design choice. A cosmetic cover 21 is shown affixed to the top of the oven housing 13 to conceal functional elements of the oven, discussed in detail below, and to aid in reducing ambient noise generated by those elements. The cover 21 may also include controls and gauges for controlling oven temperature, lights, and other such things common to ovens.

FIG. 2 shows the oven chamber 23 formed by the housing 13. The bottom wall 25 of the oven chamber 23 is relatively featureless, making it easily cleaned. The sidewalls 27 of the oven chamber 23, only one of which is shown, include a plurality of oven rack supports 29 so that multiple racks (not shown) may be slid into the oven chamber 23, thereby enabling cooking greater amounts of food simultaneously. Lights 31 are positioned in each sidewall 27 such that each oven rack support 29 is associated with at least one light. This configuration enables illumination of food on every oven rack inserted into the oven chamber 23. The back wall 33 of the oven chamber includes a plurality of heat discharge ports 35 through which heated air is discharged to enhance the cooking process. The heat discharge ports 35 are positioned such that, when all oven racks are placed in the oven chamber 23, food on each oven rack is heated by air flowing through an equal number of heat discharge ports 35. Other configurations for the heat discharge ports may be used, however, the sizes, shapes, and positions of the various heat discharge ports should be configured so that when all oven racks are inserted into the oven chamber, each rack receives substantially the same amount of heat, and the heat for each rack is substantially evenly distributed over the entire area of each rack. Such even distribution may require variations in the position, size, and shape of the various heat discharge ports along both the horizontal and vertical axes of the back wall 33 of the oven chamber 23. The top wall 37 of the oven chamber 23 includes a plurality of air intake ports 39, the majority of which are positioned toward the front of the oven chamber, away from the back wall 33, so that heated air is better drawn over inserted oven racks, by drawing heated air, from the rear of the oven chamber 23 toward the front, and up toward the top wall 37. The top wall 37 of the oven chamber 23 is a double walled structure, with the second wall 41 serving to create a cavity 43 into which air is drawn from the oven chamber recirculated to be reheated, and directed back into the oven chamber 23 through the heat discharge ports 35. A blower 45 disposed atop the oven is used to circulate the heated air into and out of the oven chamber 23. The blower 45 shown is a squirrel cage blower, but may be of any type according to design preference.

Figure 3A:
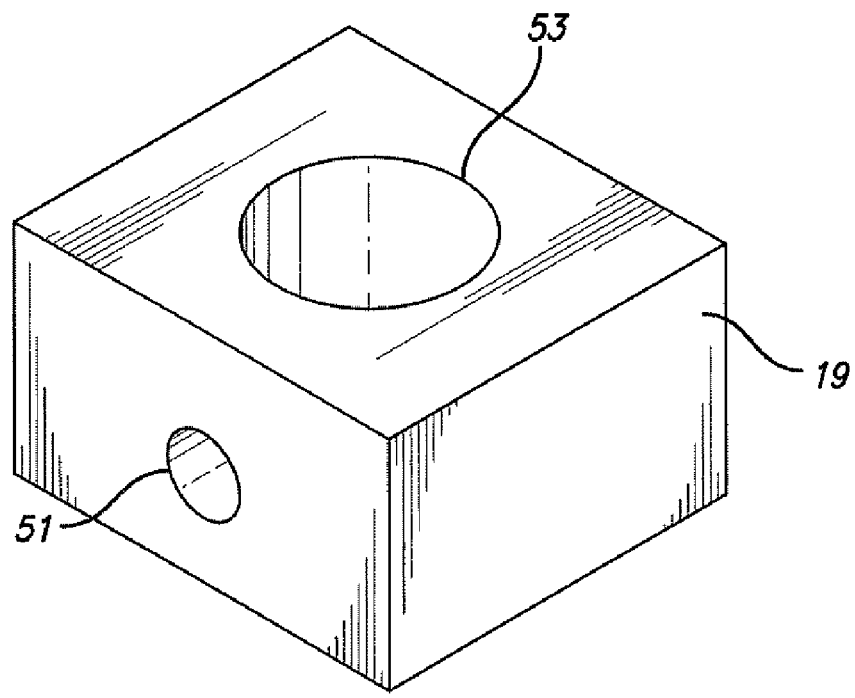
FIG. 3A illustrates a perspective view of the fire box for the convection oven.
Figure 3B:
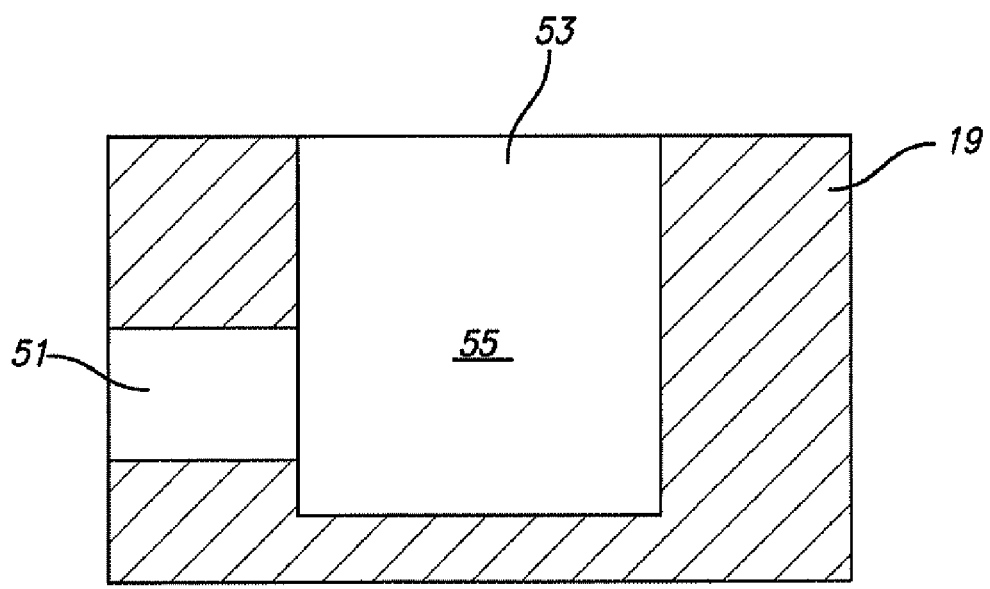
FIG. 3B illustrates a side elevation view of the fire box.
Figure 4:
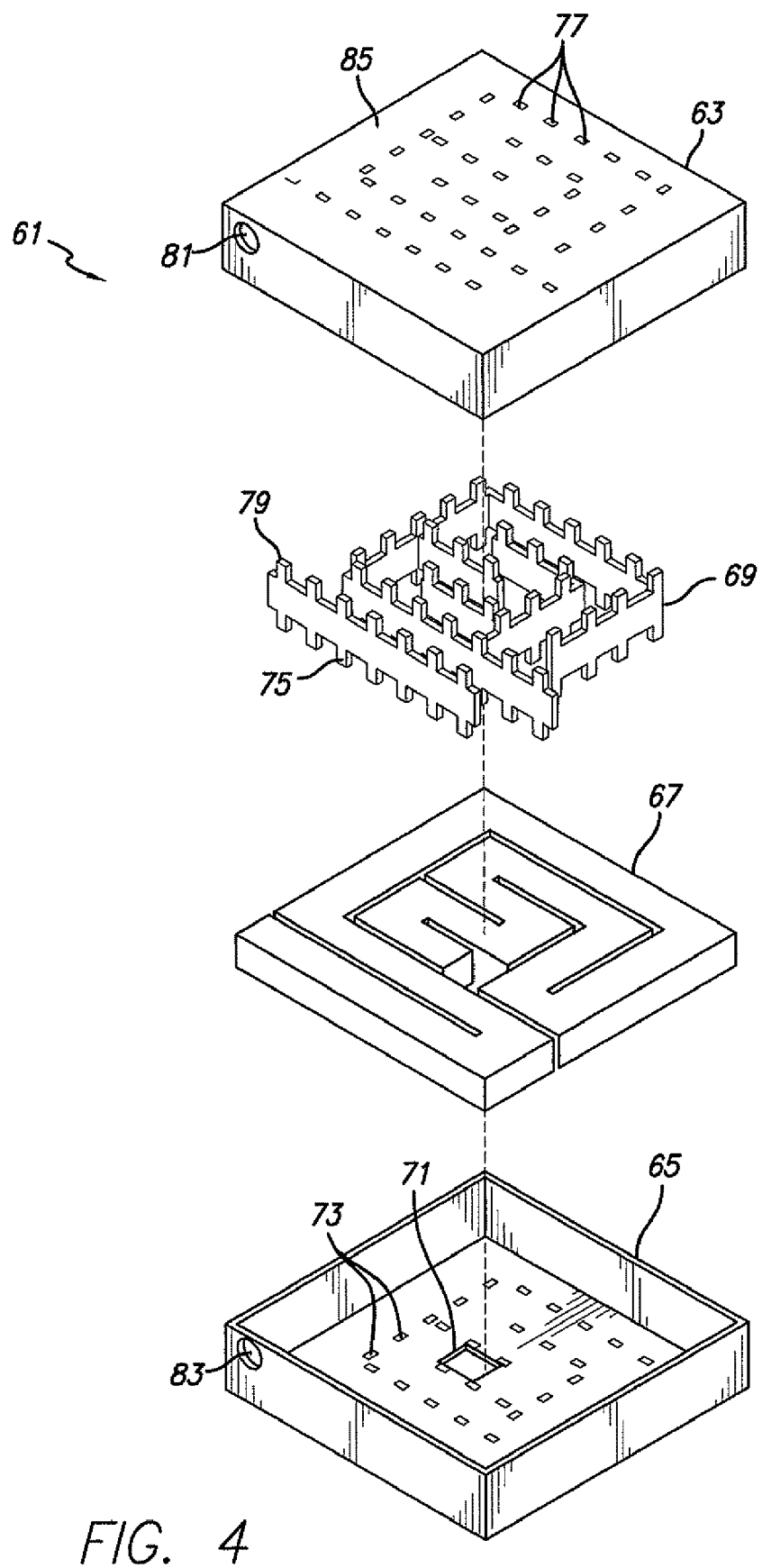
FIG. 4 is an exploded perspective view of the direct heat exchanger for the convection oven.

The fire box 19 for the convection oven 11 is shown in FIG. 3A. This fire box 19 includes a port 51 for receiving the combustion chamber of a liquid fuel burner (not shown), and a top opening 53 on the top side so that the products of combustion from the heat plenum 55 may rise up into the direct heating chamber 61, which is depicted in FIG. 4. As seen in FIG. 3B, the port 51 for the combustion chamber extends through the fire box 19 and opens up into the heat plenum 55 of the fire box 19. Heat generated by the liquid fuel burner is thereby directed up and out of the top opening 53.

Heat is generated by the liquid fuel burner, preferably of the type generally described in U.S. Pat. No. 4,298,338, the disclosure of which is incorporated herein by reference in its entirety. Advancements in this type of liquid fuel burner may be found in U.S. Pat. No. 4,507,076 and U.S. Pat. No. 4,573,904, the disclosures of which are incorporated herein by reference in their entirety. Such liquid fuel burners are available from Babington Technology, of McLean, Va., and are advantageous for use with the convection oven because they can burn any distillate fuel efficiently and cleanly without smoke, odor, or carbon monoxide emissions.

The direct heating chamber 61 is illustrated in FIG. 4. This direct heating chamber 61 is seated directly on top of the fire box, but below the bottom wall of the oven chamber. The direct heating chamber 61 includes a top housing 63, a bottom housing 65, insulation 67, and a plurality of walls 69 which are configured to form a channel within the direct heating chamber 61. The bottom housing 65 of the direct heating chamber includes a central port 71 through which hot exhaust gases from the fire box enter the direct heating chamber 61. The insulation 67 seats within the bottom housing 65 and is formed to not obstruct the entry port 71 and to permit insertion of the walls 69 through the insulation 67 into the bottom housing 65. The bottom housing 65 includes a plurality of slots 73 into which lower tabs 75 of the walls 69 are inserted and plug welded to affix the walls 69 to the bottom housing 65. The top housing 63 also includes a plurality of slots 77 for insertion and plug welding of the upper tabs 79 on each of the walls 69. The top housing 63 fits over or into the lower housing 65, and each housing part 63, 65 includes an exhaust aperture 81, 83, respectively, so that hot exhaust gases may be externally exhausted from the oven 11. Exhaust gas products directed into the direct heating chamber 61 are held between the insulation 67 and the top housing 63. The upper panel 85 of the top housing 63 serves as part of the heat exchange interface, and the insulation 67 helps ensure that heat does not escape through the bottom housing 65 of the direct heating chamber 61. The walls 69 create a channel throughout the entire direct heating chamber 61, so that hot exhaust gases pass under substantially the entire upper panel 85 of the top housing 63, heating the panel 85, before exiting through the exhaust apertures 81, 83.

Figure 5A:
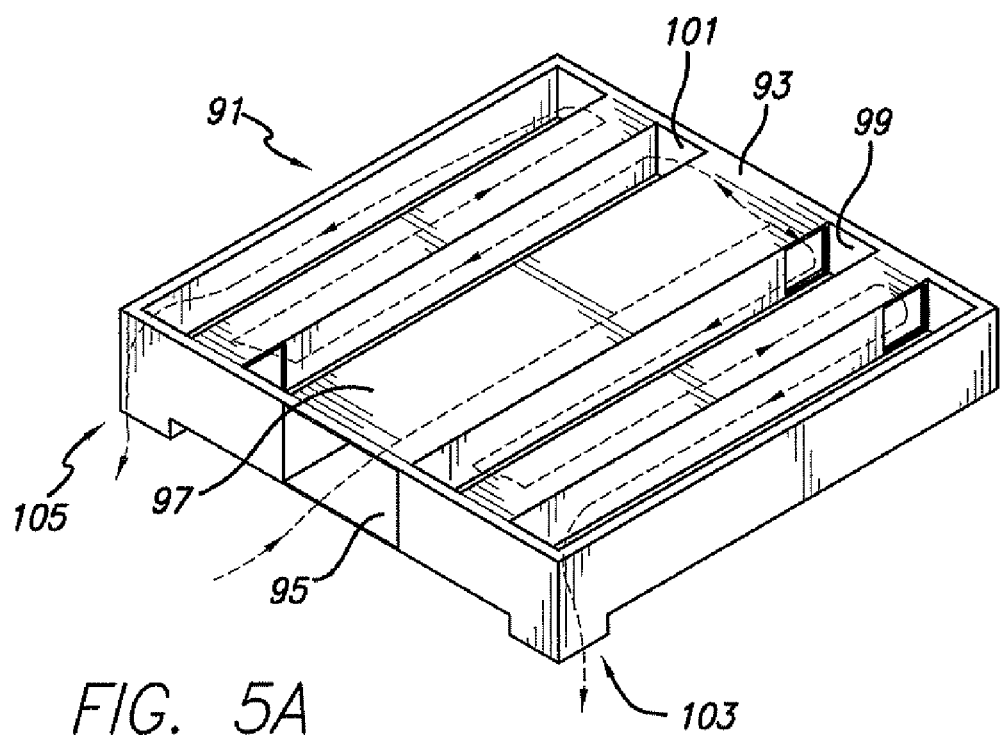
FIG. 5A is a bottom perspective view of the indirect heat exchanger for the convection oven.
Figure 5B:
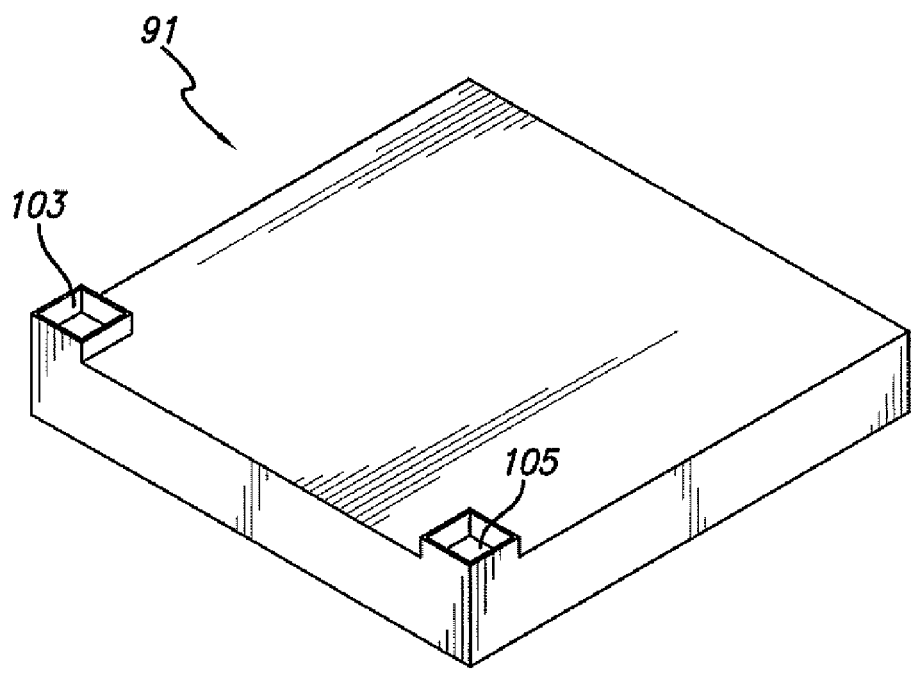
FIG. 5B is a top plan view of the indirect heat exchanger.

FIGS. 5A-B illustrate the indirect heating chamber 91, which is disposed between the direct heating chamber and the bottom wall of the oven chamber. A layer of insulation (not shown) may be disposed between the indirect heating chamber 91 and the bottom wall of the oven chamber to better control heat passing from the indirect heating chamber 91 into the oven chamber. In FIG. 5A, the bottom side 93 of the indirect heating chamber 91 is shown. This bottom side 93 seats against the top housing 63 of the direct heating chamber 61 to form the heat exchange interface between the direct and indirect heating chambers 61, 91. The indirect heating chamber 91 includes channels which are formed to direct air across substantially the entire heat exchange interface. The arrows show the direction of the air flow through the indirect heating chamber 91. Air is initially directed into the indirect heating chamber 91 through the input port 95, where it travels down substantially the entire length of the indirect heating chamber 91 in an enclosed channel 97, before being directed into two side channels 99, 101, at which point the air is directed down the entire length of the indirect heating chamber three more times as the channels 99, 101 switch back and forth across the entire length of the indirect heating chamber 91. Finally, heated air is directed out to exit ports 103, 105 at the end of the two channels, as seen in FIG. 5B. Constructed in this manner, the indirect heating chamber 91 guides air over substantially the entire heat exchange interface, thus heating, or reheating, the air before it is passed into the oven chamber.

Figure 6:
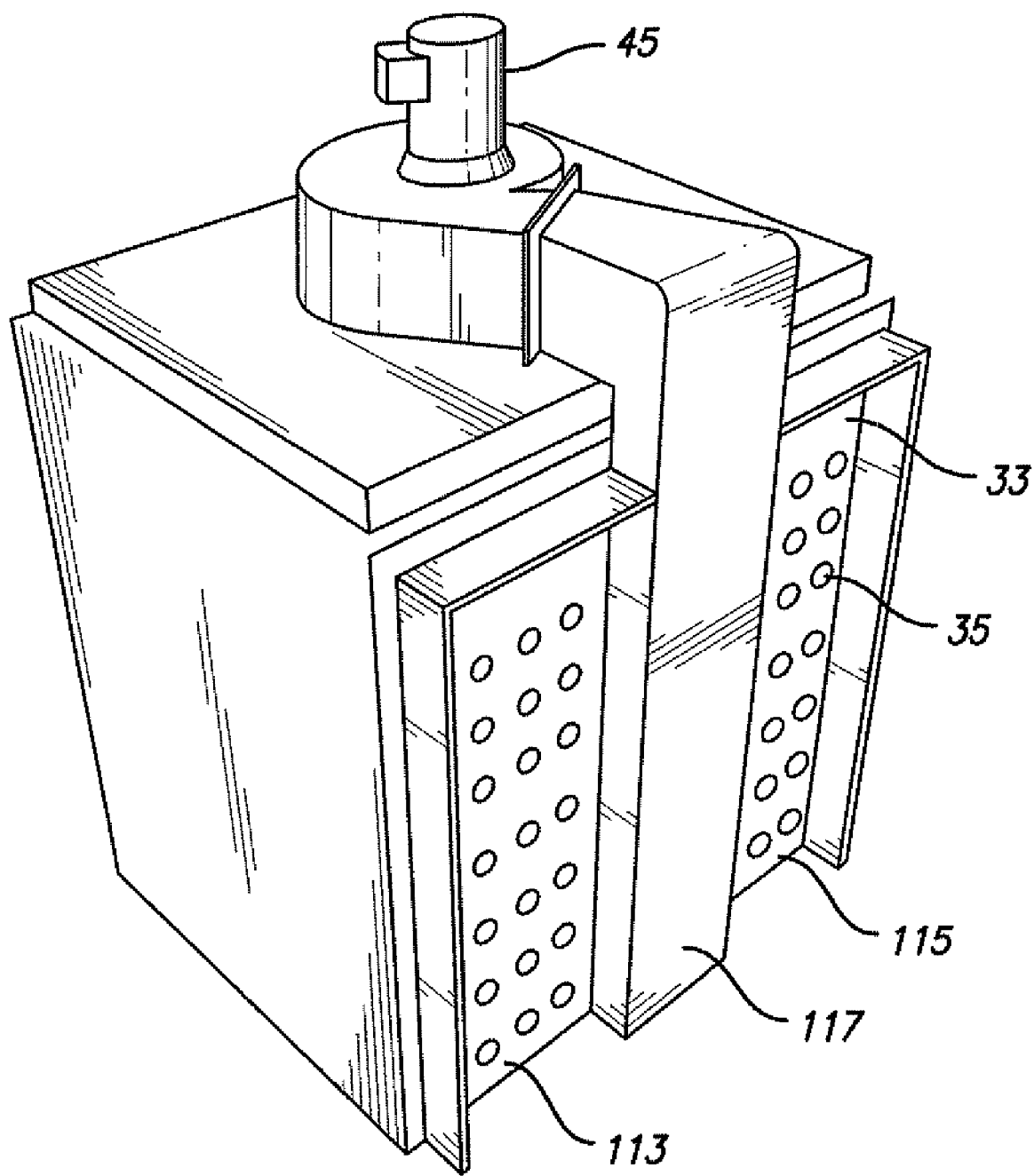
FIG. 6 is a perspective view of the rear of the convection oven.
Figure 7:
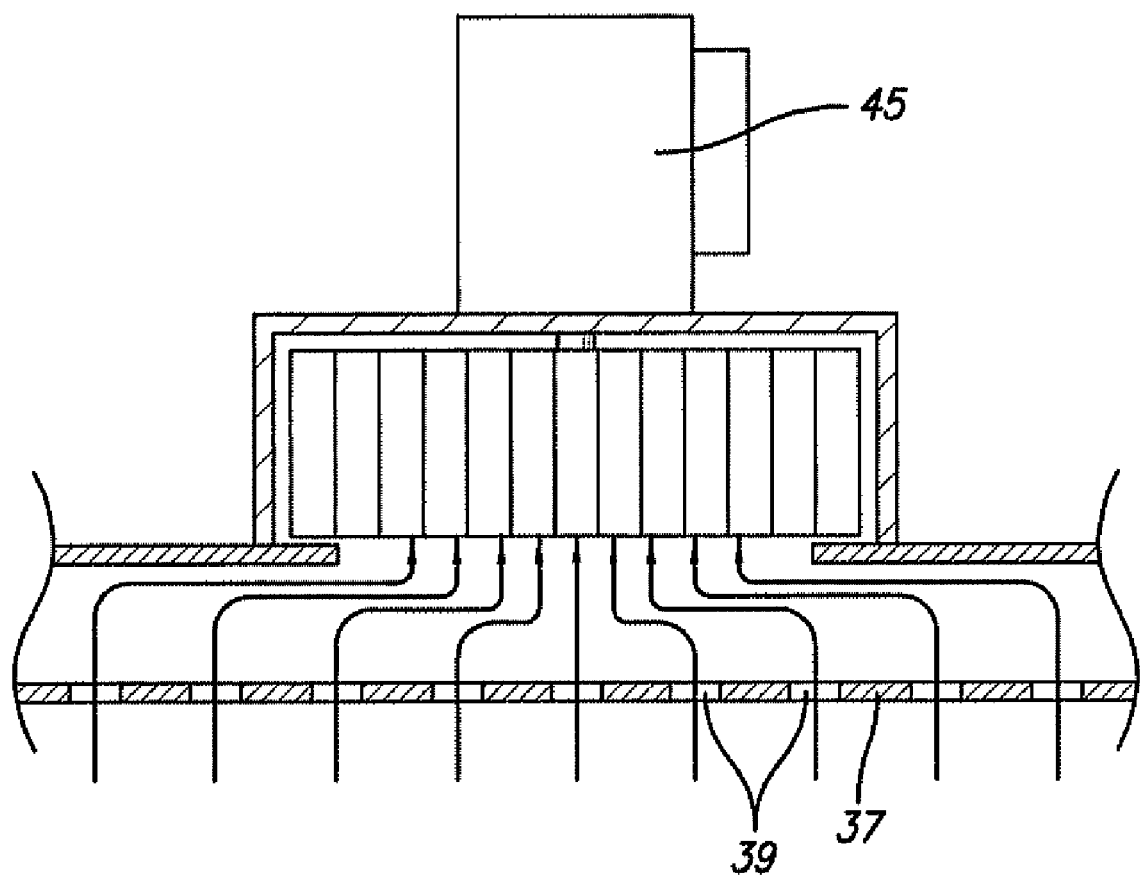
FIG. 7 is a sectional view of the top wall of the convection oven.

Heated air from the exit ports 103, 105 of the indirect heating chamber 91 is directed up into the two channels 113, 115 formed on the exterior of the back wall 33 of the oven chamber, as shown in FIG. 6. A cover (not shown) is placed over each of the channels 113, 115 to enclose the channels. The heat discharge ports 35 in the back wall 33 of the oven chamber open up into these two channels 113, 115 so that heated air from the indirect heating chamber 91 may be directed into the oven chamber 23. A center channel 117 is also formed on the back wall 33 of the oven chamber 23. This center channel 117 receives air from the blower 45 and directs that air to the input port 95 of the indirect heating chamber 91. FIG. 7 illustrates the blower 45 drawing air from the oven chamber, through the air intake ports 39 in the top wall 37 of the oven chamber, and into the cavity 43. The blower 45 directs the air into the center channel 117 on the back wall 33 of the oven chamber.

In this manner, a full circulation path is created along which air is circulated through the oven chamber 23, down to the indirect heating chamber 91, and back into the oven chamber 23. The air circulated into the oven chamber is never exposed to open flame, combustible materials, or exhaust from the combustion process. Depending upon the heat output of the burner used and the materials used to construct the convection oven, the interior of the oven chamber may be easily sustained at temperatures of 500° F. or more. Of course, lower temperatures are also easily sustained. Further, it is anticipated that other heat sources may be used in place of the liquid fuel burner, even though some may not be as efficient at heating the oven chamber as the Babington liquid fuel burner.

Thus, a convection oven is disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A convection oven comprising:
    an indirect heating chamber formed by at least one indirect heating channel fluidically coupled between an input port and an exit port;
    a housing forming an oven chamber, wherein the indirect heating chamber is disposed adjacent a bottom wall of the oven chamber, and the oven chamber and the indirect heating chamber are fluidically coupled to form part of a closed circulation path;
    an air circulator adapted to circulate air through the circulation path; and
    a direct heating chamber adjoining the indirect heating chamber at a heat exchange interface, the direct heating chamber including at least one direct heating channel adapted to direct heat across a substantial portion of the heat exchange interface, wherein the at least one direct heating channel winds along a first circuitous path across the heat exchange interface;
    a fuel burner adapted to generate heat, wherein heat from the fuel burner is transferred to the indirect heating chamber through the heat exchange interface, wherein the at least one indirect heating channel winds along a second circuitous path across the heat exchange interface.

2. The oven of claim 1, wherein the housing includes at least one access door.

3. The oven of claim 1, wherein the housing includes a plurality of air intake ports in a first wall of the oven chamber and a plurality of heat discharge ports in a second wall of the oven chamber, the air intake ports and heat discharge ports forming part of the circulation path.

4. The oven of claim 3, wherein the first wall is a top wall of the oven chamber.

5. The oven of claim 3, wherein the second wall is a side wall of the oven chamber.

6. The oven of claim 1, wherein the direct heating chamber comprises insulation disposed opposite the heat exchange interface, the at least one direct heating channel being disposed between the heat exchange interface and the insulation.

7. The oven of claim 1, wherein the direct heating chamber comprises an exhaust port.

8. The oven of claim 1, wherein the air circulator comprises a blower.

9. The oven of claim 1, wherein the air circulator is adapted to direct air emerging from the at least one indirect heating channel into the oven chamber.

10. The oven of claim 1, wherein the fuel burner comprises a liquid fuel burner.

11. A convection oven comprising:
    a housing forming an oven chamber, the housing including at least one access door, a plurality of air intake ports in a first wall of the oven chamber, and a plurality of heat discharge ports in a second wall of the oven chamber;
    an air circulator;
    an indirect heating chamber affixed to a bottom wall of the oven chamber, the indirect heating chamber being formed by at least one indirect heating channel fluidically coupled to an input port and an exit port;
    a closed circulation path fluidically coupling the air circulator, the indirect heating chamber, and the oven chamber, the air circulator being adapted to circulate air along the circulation path;
    a direct heating chamber sharing a heat exchange interface with the indirect heating chamber, the direct heating chamber including at least one direct heating channel adapted to direct hot exhaust gases across a substantial portion of the heat exchange interface, wherein each of the at least one direct heating channel and the at least one indirect heating channel winds along a circuitous path across the heat exchange interface; and
    a liquid fuel burner having a combustion chamber fluidically coupled to the direct heating chamber.

12. The oven of claim 11, wherein the first wall is a top wall of the oven chamber.

13. The oven of claim 11, wherein the second wall is a side wall of the oven chamber.

14. The oven of claim 11, wherein the air circulator comprises a blower.

15. The oven of claim 11, wherein the air circulator is adapted to draw air out of the oven chamber via the air intake ports, and direct the air through the indirect heating chamber back into the oven chamber via the heat discharge ports.

16. The oven of claim 11, wherein the circulation path is adapted to direct air emerging from the at least one indirect heating channel through the heat discharge ports.

17. The oven of claim 11, wherein the direct heating chamber comprises insulation disposed opposite the heat exchange interface, the at least one direct heating channel being disposed between the heat exchange interface and the insulation.

18. The oven of claim 11, wherein the direct heating chamber comprises an exhaust port.

* * * * *